United States Patent [19]

Campagna

[11] 4,446,896

[45] May 8, 1984

[54] CUP FILLING APPARATUS

[75] Inventor: Gerald L. Campagna, San Jose, Calif.

[73] Assignees: George Bumb; Timothy Bumb, both of San Jose, Calif.

[21] Appl. No.: 386,212

[22] Filed: Jun. 7, 1982

[51] Int. Cl.³ .................................................. B67D 3/00
[52] U.S. Cl. ..................................................... 141/198
[58] Field of Search .................. 141/1, 9, 10, 40, 41, 141/67, 70, 82, 83, 95, 96, 139, 153, 156, 157, 177, 192, 198, 351, 360, 361; 73/DIG. 11

[56] References Cited

U.S. PATENT DOCUMENTS

| | | | |
|---|---|---|---|
| Re. 26,828 | 3/1970 | Atkins et al. | 137/392 |
| 175,980 | 4/1876 | Hildebrand | 141/378 |
| 1,520,560 | 12/1924 | Burno | 222/129.4 |
| 2,523,363 | 9/1950 | Gehman | 141/1 |
| 2,663,477 | 12/1953 | Bendz | 141/198 X |
| 2,863,472 | 12/1958 | Coles et al. | 137/392 |
| 2,932,315 | 4/1960 | Jarzembski | 137/392 |
| 3,391,547 | 2/1966 | Kingston | 141/198 X |
| 3,448,778 | 6/1969 | Ramsey | 141/83 |
| 3,461,352 | 8/1969 | Worland | 361/178 |
| 3,670,765 | 6/1972 | Haynes | 137/392 |
| 3,839,645 | 10/1974 | Nickerson | 307/118 |
| 3,916,963 | 11/1975 | McIntosh | 141/198 |
| 4,040,457 | 8/1977 | Niese et al. | 141/367 |
| 4,202,387 | 5/1980 | Upton | 141/360 |
| 4,236,553 | 12/1980 | Reichenberger | 141/198 |
| 4,261,397 | 4/1981 | Guy | 141/198 X |

Primary Examiner—Stephen Marcus
Assistant Examiner—Mark Thronson
Attorney, Agent, or Firm—Phillips, Moore, Lempio & Finley

[57] ABSTRACT

An automatic control for a drink dispenser includes a plurality of sensor heads to accommodate several size cups and logic circuitry to control the flow of fluid into the cups based on the size of the cup selected.

7 Claims, 2 Drawing Figures

CUP FILLING APPARATUS

TECHNICAL FIELD

This invention relates to a control circuit for a liquid dispenser and in particular relates to a circuit for a soft-drink dispenser that is capable of sensing different sized cups and filling those cups automatically.

BACKGROUND ART

The automatic dispensing of liquids into containers such as cups is relatively simple as long as the container size remains constant. The sensing of liquid in the container has, in the past, been accomplished by electrical circuits utilizing probes, capacitance sensors, optical sensors, time and even weight.

When it is necessary to fill different sized containers from the same dispensing head, some method of sensing the size of the cup must be included so that overfill or underfill does not occur. This has been accomplished in the past by electromechanical means wherein the cup comes in contact with a probe that is displaced according to the cup size. By measuring the displacement of the probe, the fill valve can be controlled by time or some other means.

In prior devices, it has been necessary to position the cup rather carefully in order to avoid a malfunction. This is particularly true in a device that requires a probe to be displaced to determine cup size. Should the probe be incorrectly displaced the dispensing valve can either continue to run and thus overflow the machine, or alternatively provide a "short fill" to the cup. In either case, the recipient is inconvenienced.

Automatic dispensing of liquids is particularly important in the fast food environment since the tempo of business in such establishments is rather high. Thus to provide a liquid dispenser that will automatically fill various sized cups without attention of the operator would be particularly advantageous.

DISCLOSURE OF THE INVENTION

The present invention is directed to overcoming one or more of the problems set forth above. In one aspect of this invention, an automatic control for an apparatus which dispenses fluid into a container is disclosed. The apparatus has a dispensing valve for dispensing fluid when the dispensing valve is activated. The automatic control includes a plurality of first sensors each developing a first energy field and responsive to a field perturbation induced by a container when disposed in the first field and being operative to develop a first signal determined by the first field perturbation. The control also includes a plurality of second sensor means each associated with a different one of the first sensor means and developing a second energy field distinct from the first field responsive to a second field perturbation induced by fluid when elevationally commensurate with the second field and being operative to develop a second signal determined by the second field perturbation. The control includes logic circuitry responsive to the first signal of each of the first sensor means for determining an occurrence of a first field perturbation of at least one of the sensors and operative to develop a switching signal in the event the occurrence is determined. The switching signal is applied to the dispensing valve to open the dispensing valve while a logic circuit is responsive to the second signal of one of the second sensors associated with one of the first sensors and being at the highest elevation of all of the first sensors in which the occurrence is determined. Upon determination of a perturbation in the second field, a signal is developed to cancel the switching signal.

In fluid dispensing systems, it is necessary to both determine the presence of a container to be filled and also to determine the level of the fluid in the container in order to turn off the dispensing valve in the dispensing system. It is the primary object of this invention to provide an automatic control system that not only determines the presence of a container but will determine the presence of varying sized containers and will fill those containers as they are positioned under the dispensing valves and in the area of the sensing means.

BEST MODE OF CARRYING OUT THE INVENTION

Figure 1:
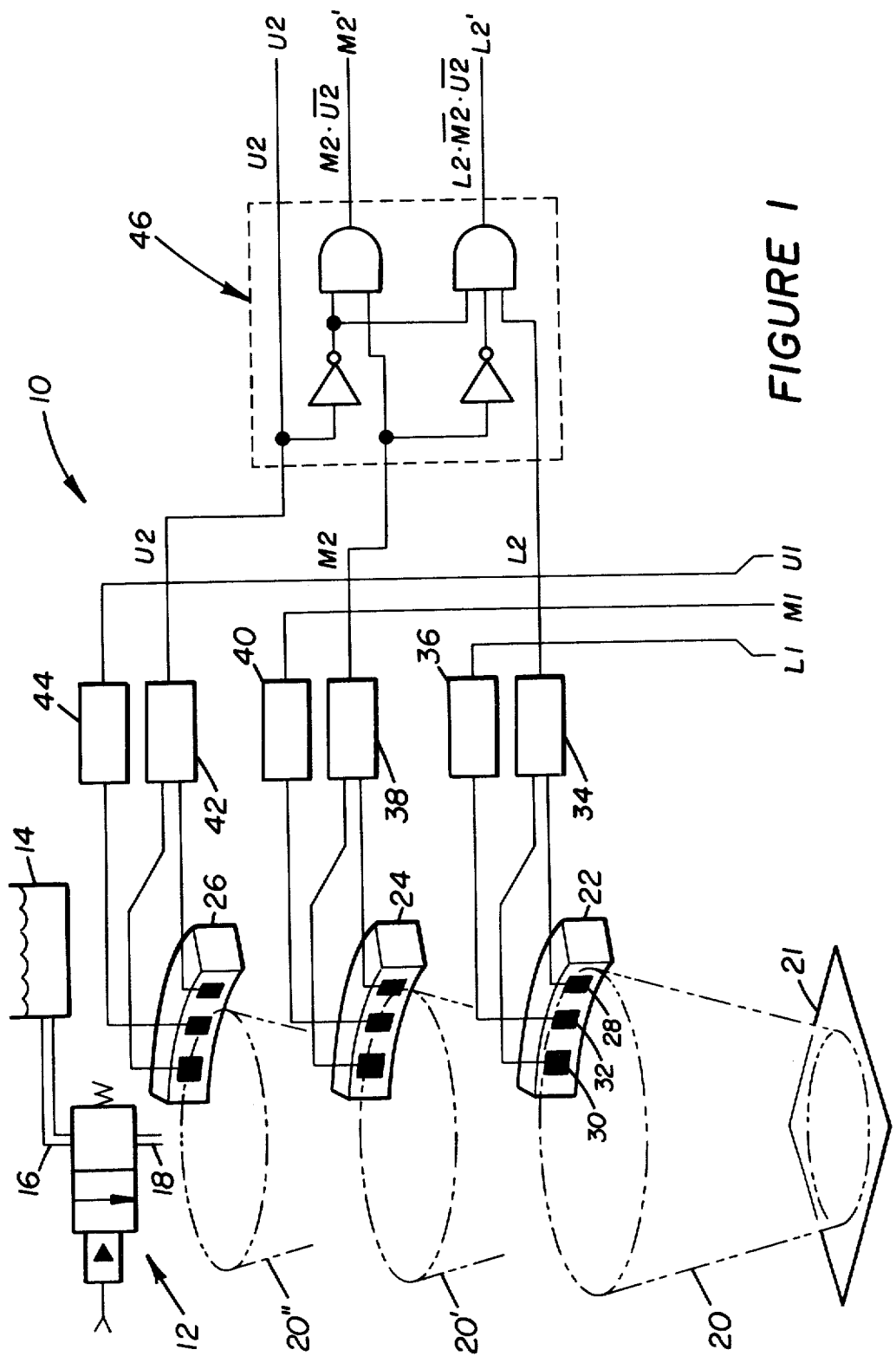
FIG. 1 is a schematic diagram of the sensing circuitry that forms a portion of this invention.

Referring now to FIG. 1, a portion of a schematic diagram of a dispensing machine 10 is shown. Fluid dispensing machine 10 includes a control valve 12 which is preferably solenoid activated and positioned normally in the closed position as shown in FIG. 1. Valve 12 is spring-biased to the closed position and operable by a solenoid. The only necessary requirement for valve 12 is that it be responsive to a signal to be opened and that it closes upon cancellation of that signal. Valve 12 controls the flow of fluid from the reservoir 14 through conduit 16 to a dispensing spout 18. Valve 12 is activated by the presence of a container such as cup 20 being positioned in the vicinity of a sensing head 22. Cup 20 may be placed on a platform 21 which forms a portion of the structure of fluid dispensing machine 10. Thus, with cup 20 positioned on platform 21 the cup may remain in the dispensing machine until full as will be described in the ensuing specification.

One of the features of fluid dispensing machine 10 is the capability to sense the presence of different sized cups or containers 20 and to automatically fill these containers based on the sensed size. Thus, the description that follows is applicable to the three sensing heads, sensing head 22 already mentioned, sensing head 24 and sensing head 26. The structure of each sensing head is identical thus only the structure of sensing head 22 will be described. Each head includes a photooptic sensor including a light source 28 which preferably is an infrared light emitting diode and a photooptic sensor 30. Sensing head 22 also includes a capacative sensor 32 of a type well known in the art to sense the presence of fluid in cup or container 20.

Each sensing head has associated therewith conventional amplifier and analog-to-digital circuitry denoted in FIG. 1 as A to D circuit 34 and A to D circuit 36. A to D circuit 34 receives intelligence from photooptic sensor 30 to indicate the presence of a container 20 while A to D circuit 36 receives intelligence from capacative sensor 32 to indicate the presence of fluid. Sensor head 24 similarly has an A to D circuit 38 to receive intelligence from a photooptic sensor and an A to D circuit 40 to receive intelligence from the capacative sensor in sensing head 24. Finally, sensing head 26 has associated with it A to D circuit 42 for photooptic intelligence and A to D circuit 44 for capacative intelligence.

The output of each of the A to D circuits is a signal which will hereinafter be referred to by a letter indicating whether the signal was received from the lower sensing head 22 denoted by L, the middle sensing head 24 denoted by M or the upper sensing head 26 denoted by U. Thus, L1 will indicate the presence of fluid sensed by photooptic sensor 32 in lower sensing head 22 while L2 will indicate the presence of a container 20 in the vicinity of lower sensing head 22.

The outputs of Analog-to-Digital circuits 34, 38 and 42 (indicating the presence of a container) are led to a first logic circuit 46. As can be seen from FIG. 1, the input to logic circuit 46 is a signal L2, M2 or U2 indicating the presence of a cup in the vicinity of sensing head 22, 24 or 26 respectively. The purpose of logic circuit 46 is to provide an output signal L2', M2' or U2' which will indicate whether the cup in the vicinity of the sensing heads is small, medium or large as the case may be. It should be apparent to those skilled in the art that if a large cup or container 20" positioned on platform 21, that sensing heads 22 and 24 in addition to sensing head 26 will generate a signal indicating the presence of a cup. Thus, there will be signals L2, M2 and U2. Logic circuit 46 will convert these three input signals so that M2' and L2' the output of logic circuit 46 will be a logical zero or "low" even in the presence of a large cup 20". This is represented in the following logic table wherein the inputs L2, M2 and U2 are shown such that the presence of a cup is indicated by a 1 while the presence of a 0 (zero) indicates no cup. It will be seen that the presence of a small cup is indicated by the signal L2' only when L2 alone has gone high. It will also be seen that with a tall cup, L2, M2, and U2 are high but only the output U2 is high. The "not possible" combinations occur when a tall cup is sensed by sensing head 26 but no cup is sensed by a lower head. While this could occur if one were to hold a small cup above platform 21 it is unlikely.

| Logic - Circuit 46 | | | | | | |
|---|---|---|---|---|---|---|
| In | | | Out | | | |
| L2 | M2 | U2 | L2' | M2' | U2 | |
| 0 | 0 | 0 | 0 | 0 | 0 | No cup |
| 0 | 0 | 1 | 0 | 0 | 1 | Tall Cup (not possible) |
| 0 | 1 | 0 | 0 | 1 | 0 | Middle Cup (not possible) |
| 0 | 1 | 1 | 0 | 1 | 0 | Tall Cup (not possible) |
| 1 | 0 | 0 | 1 | 0 | 0 | Small Cup |

| Logic - Circuit 46 | | | | | | |
|---|---|---|---|---|---|---|
| In | | | Out | | | |
| L2 | M2 | U2 | L2' | M2' | U2 | |
| 1 | 0 | 1 | 0 | 0 | 1 | Tall Cup (not possible) |
| 1 | 1 | 0 | 0 | 1 | 0 | Middle Cup |
| 1 | 1 | 1 | 0 | 0 | 1 | Tall Cup |

The developed signals from logic circuit 46, L2', M2' and U2 are provided to a second logic circuit 48 along with the output of the capacitive sensors 32 of sensing heads 22, 24 and 26, represented by the signals L1, M1 and U1, respectively. Also provided to logic circuit 48 are the signals L2 and M2 for a purpose which will be shown in the ensuing discussion.

Second logic circuit 48 serves to provide a signal to valve 12 when the presence of a cup or container 20 is sensed by one of the sensing heads 22, 24 or 26 and to close valve 12 when the cup or container 20, 20' or 20" has reached the desired fill level. It should be pointed out that if the dispensing machine also provides ice for cooling the dispensed liquid that the ice will have no effect since it will float upwardly with the dispensed fluid.

Figure 2:
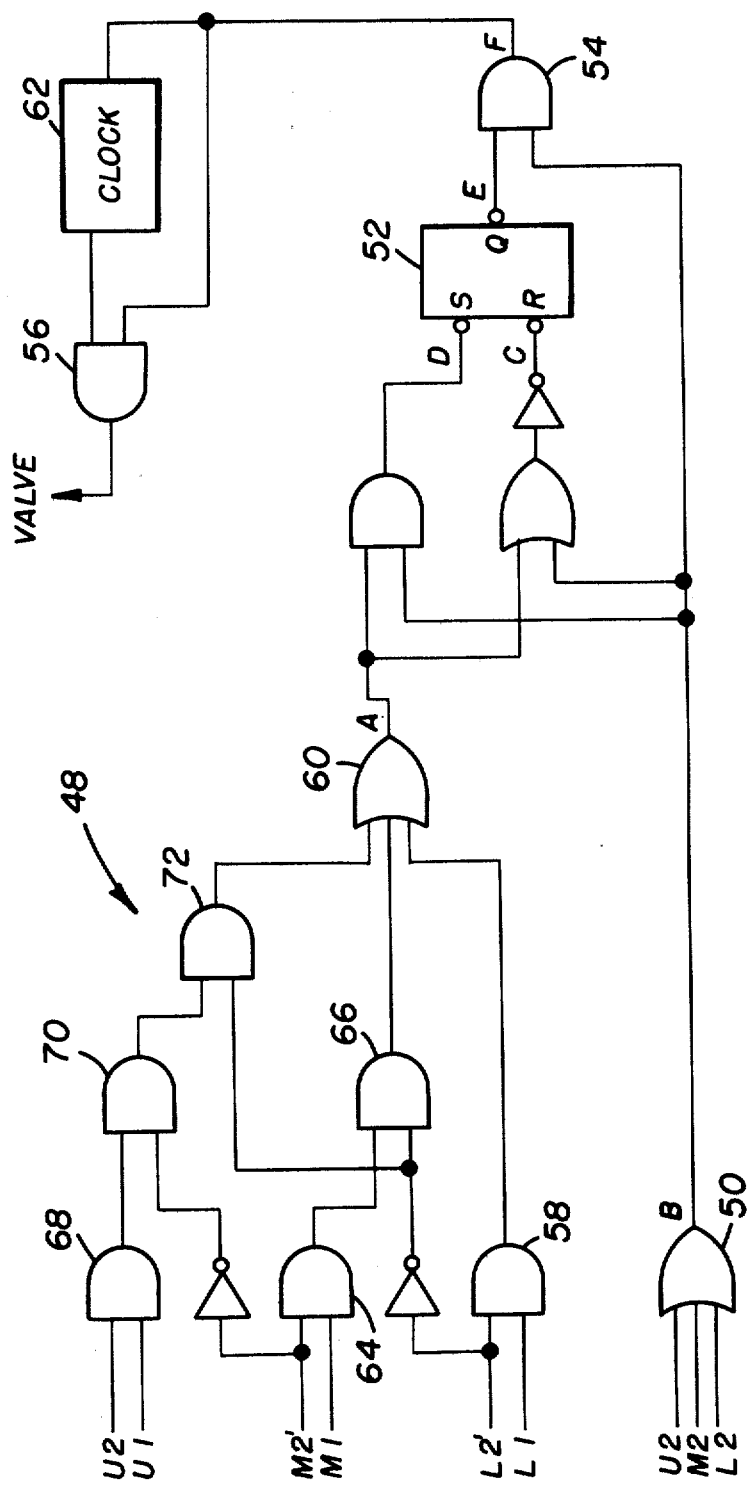
FIG. 2 is the logic circuitry that forms the remaining portion of this invention.

Referring specifically to FIG. 2, specific node points have been designated by letters which are reflected in the following logic table for logic circuit 48. This table shows the binary status at each node point under the various conditions.

| | Logic - Circuit 48 | | | | | | | | | | | |
|---|---|---|---|---|---|---|---|---|---|---|---|---|
| | In | | | | | | Out | | | | | |
| | L1 | L2' | M1 | M2' | U1 | U2 | A | B | C | D | E | F | |
| No cup | 0 | 0 | 0 | 0 | 0 | 0 | 0 | 0 | 1 | 0 | 1 | 0 | |
| Small Cup arrives | 0 | 1 | 0 | 0 | 0 | 0 | 0 | 1 | 0 | 0 | 1 | 1 | Valve Opens |
| Small Cup filled | 1 | 1 | 0 | 0 | 0 | 0 | 1 | 1 | 0 | 1 | 0 | 0 | Valve Closes |
| Med. Cup arrives | 0 | 0 | 0 | 1 | 0 | 0 | 0 | 1 | 0 | 0 | 1 | 1 | Valve Opens note small |
| (small cup fill level | 1 | 0 | 0 | 1 | 0 | 0 | 0 | 1 | 0 | 0 | 1 | 1 | cup L2' is 0) |
| Med. cup fill | 1 | 0 | 1 | 1 | 0 | 0 | 1 | 1 | 0 | 1 | 0 | 0 | Valve closes |
| Large cup arrives | 0 | 0 | 0 | 0 | 0 | 1 | 0 | 1 | 0 | 0 | 1 | 1 | Valve opens |
| Large cup | 1 | 0 | 1 | 0 | 1 | 1 | 1 | 1 | 0 | 1 | 0 | 0 | Valve closes |

Logic circuit 48 accepts signal L2, M2 or U2 indicating the presence of a cup at an OR gate 50 so that the output B is fed to the reset or R terminal of SR flip-flop 52 so that the output E of SR flip-flop 52 goes high. The combination of the high signal from flip-flop 52 and the indication of a cup by a high signal from OR gate 50 is fed to AND gate 54. The output of AND gate 54 is combined with the output of a clock 62. Clock 62 serves as a timing device to close valve 12 after a specific time should the remaining circuitry fail. The time interval selected may be longer than the time to fill the largest cup at the lowest anticipated flow rate. These two signals are fed through AND gate 56 to actuate valve 12 causing fluid to commence flowing.

Valve 12 is deactivated or closed as a result of a signal received at the set side of SR flip-flop 52. Assuming for example that a small cup is present on platform 21, it can be seen that when a signal is received at L1 AND gate 58 goes high as does OR gate 50 setting SR flip-flop to low thereby cancelling the signal to AND gate 54 with the resultant closure of valve 12. Clock 62, which may be started by the output of AND gate 54 would serve no purpose as long as the signal is received from the capacative sensor that the container has been filled. However, if for some reason the capacative sensor fails clock 62 can be set to stop or close valve 12 after a given period of time. It should be noted that clock 62 may also receive intelligence from the output of logic circuit 46 so that valve 12 remains open in relation to the size of the container sensed. Since clock circuitry such as this is well known in the art no further description of clock 62 will be provided.

Now assuming a medium sized cup 20' is sensed, the valve will be open by the presence of signals L2 and M2 at OR gate 50. When medium sized cup 20' reaches the level of fill of a small cup, it can be seen in logic circuit 48 that L2' remains low and AND gate 58 thus remains low so that valve 12 is not closed by the small cup fill level being reached as is signalled by L1 going high. However, when M1 goes high i.e., sensing head 24 senses fluid, AND gate 64, which is concurrently receiving signal M2' indicating the presence of a middle size cup, goes high along with AND gate 66 setting flip-flop 52 and closing valve 12. A similar analysis occurs upon the sensing of a large cup. Again valve 12 is opened when the cup is sensed and closed when U1 goes high thus causing AND gate 68 to go high. The high signal from AND gate 68 is combined at AND gates 70 and 72 with signals indicating that the cup present is neither a middle size cup nor a small cup thus providing a high signal to OR gate 60 and the consequent setting of flip-flop 52 with the subsequent shutting of valve 12.

Operation

The aforedescribed description of the preferred embodiment should provide sufficient information to one skilled in the art to enable one to understand the operation of the drink dispenser. However, the following comments are offered for further clarification.

Initially reference should be made to the tables above of logic circuit 46 and logic circuit 48 so that one could understand the particulars of the ensuing discussion. With a cup 20 positioned on platform 21, a signal is generated through the perturbation of the photooptic sensing portion of sensing head 22. This causes a high signal at node B which in turn resets flip-flop 52 resulting in a high signal at F to open valve 12. When the level of fluid reaches the desired level as sensed by capacitance sensor 32, OR gate 60 goes high resulting in SR flip-flop 52 going low along with AND gate 54 thereby closing valve 12.

Similarly, as a medium or a large cup arives, valve 12 is opened in the same manner as with the small cup because of the presence of a high signal at node B or OR gate 50. When the medium cup is filled OR gate 60 goes high thus setting flip-flop 52 and closing valve 12. It is pointed out as was indicated above that when the fill level reaches the small cup level, valve 12 is not shut since AND gate 66 requires high signals from both the output of AND gate 64 and an inverted signal on line L2 which indicates that a cup is present that is larger than a small cup. This intelligence is developed in logic circuit 46.

A similar analysis can be made for the arrival of the large cup 20" as was made with the presence of the medium and small cup.

Referring now specifically to FIGS. 1 and 2, it can be seen that the automatic control for dispensing drinks can be adapted to any number of cup sizes by the mere addition of concatenating logic circuits in logic circuits 46 and 48. This should be apparent to one skilled in the art upon examination of these two circuits. Thus it should be understood that while this description has been addressed to three different sized cups, it is equally applicable to other numbers of cups or containers. Again, it is pointed out that clock 62 may be started by a signal out of logic circuit 46 so that valve 12 is turned off after a period of time known to be in excess of the desired fill time. While it could be said that a clock could replace the logic circuitry herein, this is not necessarily true since fluid pressures may cause differing flow rates through valve 12. Thus to depend on time alone can result in a "short fill" of the container 20, 20' or 20" as the case may be. Clock 62 serves only as a safety feature to turn off the valve after a specified period of time. It is recognized that a certain amount of overflow may occur but the machine will not continue to pump fluid until reservoir 14 is empty.

Other aspects, objects and advantages of this invention can be obtained from a study of the drawings, the disclosure and the appended claims.

What is claimed:

1. An automatic control for an apparatus of the type which dispenses fluid into a container and which has a dispensing valve having an outlet for dispensing said fluid when said dispensing valve is activated, said automatic control comprising:

a plurality of first sensor means, each of said first sensor means for developing a first energy field, said first energy field being perturbed by the presence of a container disposed therein; and, in response to a first energy field perturbation caused by the presence of a container, each of said first sensor means further for developing a first signal, each of said first sensor means deployed at differing distances below said outlet of said dispensing valve;

a plurality of second sensor means, each of said second sensor means being associated with a different one of said first sensor means; said second sensor means for developing a second energy field distinct from said first energy field, said second energy field being perturbed by the presence of fluid in said second energy field; and, in response to said second field perturbation caused by the presence of said fluid, each of said second sensor means further for developing a second signal; and logic means responsive to said first signal of each of said first sensor means for determining an occurrence of said first field perturbation at at least one of said first sensor means and operative for developing a switching signal in the event said occurrence is determined for application to said dispensing valve to activate said dispensing valve, said logic means further responsive to said second signal of one of said second sensor means associated with the one of said first sensor means being at the highest elevation of all of said first sensor means in which said occurrence of said first field perturbation is determined for determining an occurrence of said second field perturbation and operative to cancel said switching signal when said occurrence of said second field perturbation is determined.

2. An automatic control as set forth in claim 1 wherein each of said first sensor means includes:

a source of photoenergy, said photoenergy defining said first energy field; and photoelectric means responsive to photoenergy for developing said first signal, said first signal having a first state in the absence of said first field perturbation and a second state during said occurrence of said first field perturbation.

3. An automatic control as set forth in claim 2 wherein said source is a light emitting diode.

4. An automatic control as set forth in claim 2 wherein said photoenergy is in the infra red spectrum.

5. An automatic control as set forth in claim 1 wherein one of said first sensor means and one of said second sensor means associated therewith defines a unitary sensor head.

6. An automatic control as set forth in claim 1 wherein each of said second sensor means includes:

field means for developing an electric field, said electric field defining said second energy field, said field means being responsive to said second field perturbation and being operative to develop an electrical signal determined by said second field perturbation, electronic switch means responsive to said electrical signal for developing said second signal, said second signal having a first state in the absence of said second field perturbation and a second state during said occurrence of said second field perturbation.

7. An automatic control as set forth in claim 1 wherein said logic means includes logic circuitry responsive to the plurality of first sensor means for developing a single signal indicative of the highest elevation of the occurrence of said first field perturbation.

* * * * *